United States Patent [19]

Maloney

[11] Patent Number: 4,882,773

[45] Date of Patent: Nov. 21, 1989

[54] AUDIO MICROPHONE SYSTEM WITH DIGITAL OUTPUT AND VOLUME CONTROL FEEDBACK INPUT

[75] Inventor: Michael O. Maloney, Los Angeles, Calif.

[73] Assignee: Donald A. Streck, Ventura, Calif. ; a part interest

[21] Appl. No.: 190,346

[22] Filed: May 5, 1988

[51] Int. Cl.$^4$ .................... H04B 9/00

[52] U.S. Cl. .................... 455/617; 455/603; 455/608; 455/612

[58] Field of Search .................... 455/601, 603, 606, 607, 455/608, 609, 610, 612, 613, 614, 617-620

[56] References Cited

U.S. PATENT DOCUMENTS

| | | | |
|---|---|---|---|
| 3,513,443 | 5/1970 | Andersen | 455/603 |
| 3,622,791 | 11/1971 | Bernard | 455/614 |
| 3,657,543 | 4/1972 | Rose | 455/619 |
| 3,903,497 | 9/1975 | Stimler | 455/612 |
| 4,151,407 | 4/1979 | McBride | 455/617 |
| 4,481,677 | 11/1984 | Li et al. | 455/617 |
| 4,709,412 | 11/1987 | Seymour | 455/603 |

FOREIGN PATENT DOCUMENTS

| | | | |
|---|---|---|---|
| 0027043 | 4/1981 | European Pat. Off. | 455/619 |
| 0075041 | 5/1982 | Japan | 455/612 |
| 0230533 | 10/1986 | Japan | 455/613 |

*Primary Examiner*—Robert L. Griffin
*Assistant Examiner*—L. Van Beek
*Attorney, Agent, or Firm*—Donald A. Streck

[57] ABSTRACT

A microphone/pickup system employing a digital signal throughout. There are a pluraílty of digital microphone/pickup devices each comprising, a microphone/pickup element for sensing sound vibrations and for producing an analog electrical signal reflecting the sound vibrations at an output thereof. An analog to digital converter is directly connected to receive the analog electrical signal at an input thereof and produce a digital signal reflecting the sound vibrations at an output thereof, the output of the analog to digital converter being the output of the microphone/pickup device. Preferably, there is a support structure carrying each microphone/pickup element and its associated analog to digital converter in combination as well as a plurality of user devices disposed at a location removed from the support structure and operatively connected to receive and use the digital signal from respective ones of the digital microphone/pickup devices. Wireless RF broadcasting microphones and pickups are employed as are wireless transmission of the digital signals by light beam and through optic fiber cables. When wirelessly connecting a plurality of microphone/pickup devices to, for example, a mixer board, the microphone/pickup devices employ selectable RF carriers with the light beams and the mixer channels each have the ability to detect the light beams and select the carrier frequency to be associated therewith whereby the mixer channels can each select which microphone/-pickup device it is to control. A microphone/pickup device including a volume control responsive to a return light signal from a mixer channel is also employed. Large systems are shown employing RF or IR transmission of the signals from the stage area to a remote mixer board location.

9 Claims, 5 Drawing Sheets

AUDIO MICROPHONE SYSTEM WITH DIGITAL OUTPUT AND VOLUME CONTROL FEEDBACK INPUT

BACKGROUND OF THE INVENTION

The present invention relates to microphones and audio systems and, more particularly, to a microphone/pickup device providing a digital output therefrom comprising, microphone element means for sensing sound vibrations and for producing an analog electrical signal reflecting said sound vibrations at an output thereof; and analog to digital converter means directly connected to receive said analog electrical signal at an input thereof and for producing a digital signal reflecting said sound vibrations at an output thereof, said output of said analog to digital converter means being the output of the microphone/pickup device.

Despite rapid advances in audio technology in general, the overall methodology related to microphones (where that term includes audio pickups and signal generating devices of all types) has progressed little beyond the stage of such devices at the time that Orson Wells employed one to scare the wits out of us with his famous "War of the Worlds" radio broadcast some fifty years ago. As depicted in FIG. 1, an early microphone 10 comprised a vibration isolating stand 12 containing a sound detecting and signal generating element 14 from which an electrical cable 16 extended to the amplifiers, etc. associated with the system. The early elements 14 contained packed carbon granules that changed electrical resistance as a function of sound vibrations. Later, positive electrical signal generation replaced the carbon granules. A diaphragm's vibrations as a result of sound energy striking it were, for example, employed to move a magnet in a coil or deflect a piezoelectric crystal. A similar approach was employed in the cartridges employed to generate a signal from the grooves in a phonograph record and for the pickups employed with musical instruments, and the like, to create a direct audio signal from the sound vibrations emanating from the device.

In a typical contemporary commercial sound environment such as a recording studio or live performance, a system such as that depicted in FIG. 2 is employed. Several modern, lightweight microphones 10' (and pickups, not shown, for the musical instruments) are connected by wire cables 18 to a mixer panel 20. Each of the microphones 10' is connected via its cable 18 to mixer channel 22 of the mixer panel 20. A sound engineer can then use the controls on each of the mixer channels 22 to control the input to the system from its associated microphone 10'. The inputs from the musical instruments can, of course, be controlled in like manner. In a live performance, the outputs from the mixer panel 20 are connected directly to amplifiers 24 driving speakers 26. While the producing of records and magnetic tapes was (and in many cases still is) accomplished with the analog electrical signals out of the mixer panel 20, the advent of the compact disk (CD) system of sound recording and playback employing digital techniques has pushed all modes of quality recording towards this approach. Thus, as depicted in FIG. 2, the signals out of the mixer panel 20 can be passed through an analog to digital (A/D) converter 28. The digital output from the A/D converter 28 is then used to make a record 30, tape 32, or CD 34. While not shown, the digital signal can be enhanced, modified, or otherwise conditioned digitally, if desired, before being employed in the actual recording process onto the recording medium. The drawing is, of course, simplified for the purposes of depicting the environment and additional processes and equipment are typically employed in the actual production of the final recorded product. In this regard, it should also be noted that while some of the more recently developed musical instruments produce "sound" by synthesis and employ digital circuitry within them for that purpose, the final synthesized output of the digital circuitry is converted to an analog electrical signal prior to use; that is, the output of the instrument is connected to a cable 16 and delivers an analog signal thereto.

Because the cables 16 are aesthetically unpleasing, cumbersome, and potentially dangerous for performers moving about while doing a live concert, or the like, the prior art wireless microphone 36 of FIG. 3 has achieved certain popularity. A small microphone 10" is placed within a hand-holdable housing 38 along with a low power FM transmitter 40. Powered by a small battery (not shown), the wireless microphone 36 broadcasts the audio signal as an analog signal modulated on the carrier from the transmitter 40. The signal from the transmitter 40 is received offstage by an FM receiver which demodulates the analog audio signal and connects it to a cable 16 leading to the mixer panel 20. Typically, a mixture of directly cabled microphones 10' and wireless microphones 36 are employed with a system such as that shown in FIG. 2.

As can be appreciated from the foregoing, even with some use of wireless microphones such as the microphone 36 of FIG. 3, a commercial sound system can sometimes employ literally miles of cable 16. For systems that must be dismantled, moved and reassembled periodically, this is a costly and time consuming approach. Moreover, the use of electrical analog signals for a great portion of the system creates problem of its own. Analog components at the mixer panel 20 inject noise and distortion. Line losses and bad connections in the cables 16 reduce the signal level while increasing the noise level.

Wherefore, it is the object of the present invention to provide an improved microphone/sound pickup system which converts the analog signal to a digital signal as soon as possible.

It is another object of the present invention to provide an improved microphone/sound pickup system which eliminates hard wire electrical cabling to the maximum degree possible.

It is still another object of the present invention to provide an improved microphone/sound pickup system which permits control of volume, and the like, through the use of non-analog components.

Other objects and benefits of the present invention will become apparent from the description which follows hereinafter when taken in conjunction with the drawing figures which accompany it.

SUMMARY

The foregoing objects have been achieved the microphone/pickup system of the present invention which employs a digital signal throughout and which comprises, a plurality of digital microphone/pickup devices each comprising - microphone/pickup element means for sensing sound vibrations and for producing an analog electrical signal reflecting the sound vibrations at an output thereof; analog to digital converter means connected to directly receive the analog electrical signal at an input thereof and for producing a digital signal reflecting the sound vibrations at an output thereof, the output of the analog to digital converter means being the output of the microphone/pickup device; and, a plurality of user devices disposed at a location removed from the support structure and operatively connected to receive and use the digital signal from respective ones of the digital microphone/pickup devices. In the preferred embodiment, there are support structure means carrying the microphone/pickup element means and the analog to digital converter means in combination.

In one embodiment, RF (i.e. FM) transmitter means are carried by at least one of the support structure means and operably connected to be activated by the output of the analog to digital converter means thereof whereby the FM transmitter means emits a beam of RF energy modulated with the digital signal; and, FM receiver means are provided for receiving the beam of RF energy, for demodulating the digital signal therefrom and for connecting the demodulated digital signal to a user device.

In another embodiment, light emitting diode means are carried by at least one of the support structure means and operably connected to activated by the output of the analog to digital converter means thereof whereby the light emitting diode means emits a beam of light modulated with the digital signal; and, light receiver means are provided for receiving the beam of light, for demodulating the digital signal therefrom and for connecting the demodulated digital signal to a user device.

Optionally, fiber optic cable means are carried by the support structure means and operably connected between the light emitting diode means and the light receiver means.

According to another embodiment, mixer means are carried by at least one support structure means for producing an output therefrom comprising the combination of signals input to a pair of inputs thereof, the output of the analog to digital converter means thereof being connected to one of the pair of inputs of the mixer means; radio frequency generator means are carried by the at least one support structure means for generating an RF signal at an output thereof, the output of the radio frequency generator means being connected to the other of the pair of inputs of the mixer means; light emitting diode means are carried by the at least one support structure means and operably connected to activated by the output of the mixer means whereby the light emitting diode means emits a beam of light modulated with the digital signal and an RF carrier; and, light receiver means are provided for receiving the beam of light, for demodulating the digital signal therefrom and for connecting the demodulated digital signal to a user device.

In a preferred embodiment, means are carried by the at least one support structure means for selectably adjusting the frequency of the output of the radio frequency generator means and means are included in the light receiver means for selecting the RF frequency to be removed to produce the digital signal.

In another preferred embodiment at least one the microphone/pickup element includes volume control means for changing the amplitude of the analog electrical signal whereby the volume of the output from the microphone/pickup device is controllable; and additionally, light detector means are carried by the support structure means thereof and operably connected to the volume control means for detecting a volume control light signal input thereto and for transmitting the volume control light signal to the volume control means to cause the volume control means to change the amplitude of the analog electrical signal as dictated by the volume control light signal; and, means are associated with at least one user device for outputting a volume control light signal to set the volume of the microphone/pickup device.

The preferred microphone/pickup element is an electrostatic element comprising a movable conductive diaphragm disposed between a pair of electrostatic grid plates and the volume control means comprises a variable DC power source connected to the electrostatic grid plates for applying a DC voltage potential thereacross and means responsive to the volume control light signal for setting the DC voltage potential output by the variable DC power source to the electrostatic grid plates to a level indicated by the volume control light signal.

In one large system, light emitting diode means are carried by at least one support structure means and operably connected to activated by the output of the analog to digital converter means thereof whereby the light emitting diode means emits a beam of light modulated with the digital signal; light receiver means are provided for receiving the beam of light, for demodulating the digital signal therefrom and for providing the demodulated digital signal at an output thereof; fiber optic cable means are carried by the support structure means and operably connected between the light emitting diode means and the light receiver means; RF transmitter means are disposed at a location removed from the support structure means and operably connected to be activated by the output of the light receiver means whereby the RF transmitter means emits a beam of RF energy modulated with the digital signal; and, RF receiver means are disposed adjacent a user device for receiving the beam of RF energy, for demodulating the digital signal therefrom and for connecting the demodulated digital signal to the user device.

In another large system, light emitting diode means are carried by at least one support structure means and operably connected to be activated by the output of the analog to digital converter means thereof whereby the light emitting diode means emits a beam of light modulated with the digital signal; light receiver means are provided for receiving the beam of light, for demodulating the digital signal therefrom and for providing the demodulated digital signal at an output thereof; fiber optic cable means are carried by the support structure means and operably connected between the light emitting diode means and the light receiver means; light beam transmitter means are disposed at a location removed from the support structure means and operably connected to be activated by the output of the light receiver means whereby the light beam transmitter means emits a beam of light modulated with the digital signal; and, light beam receiver means are disposed adjacent a user device for receiving the beam of light, for demodulating the digital signal therefrom and for connecting the demodulated digital signal to the user device.

DESCRIPTION OF THE PREFERRED EMBODIMENTS

Figure 2:
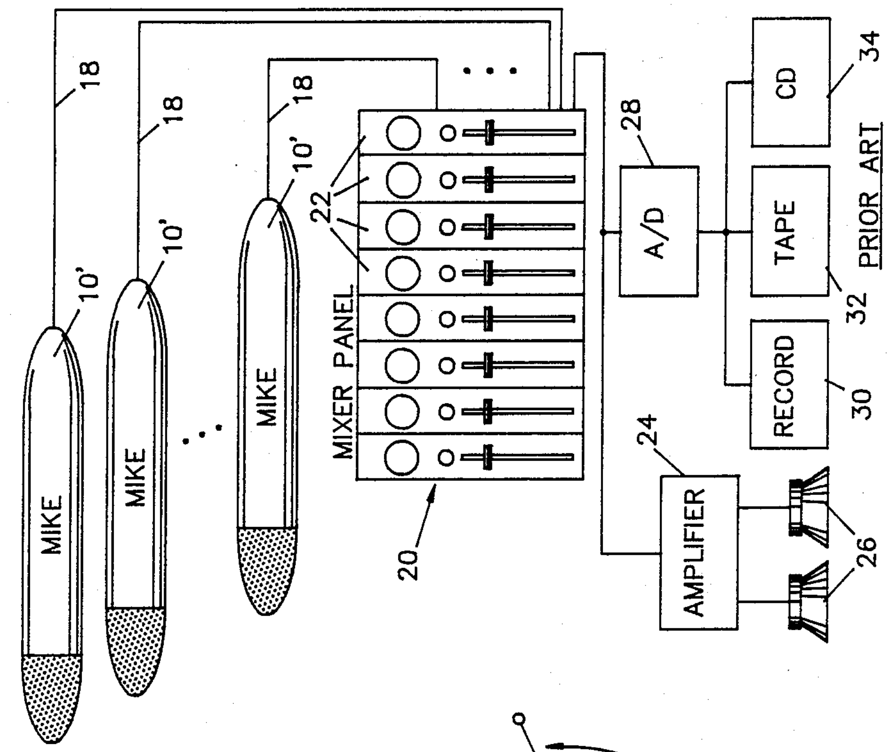
FIG. 2 is a very simplified drawing of a typical commercial sound system as employed for live performance and recording purposes.
Figure 1:
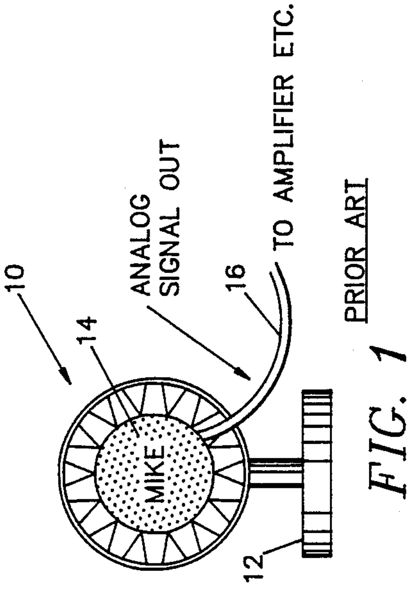
FIG. 1 is a simplified drawing of a prior art microphone as Originally developed.
Figure 3:
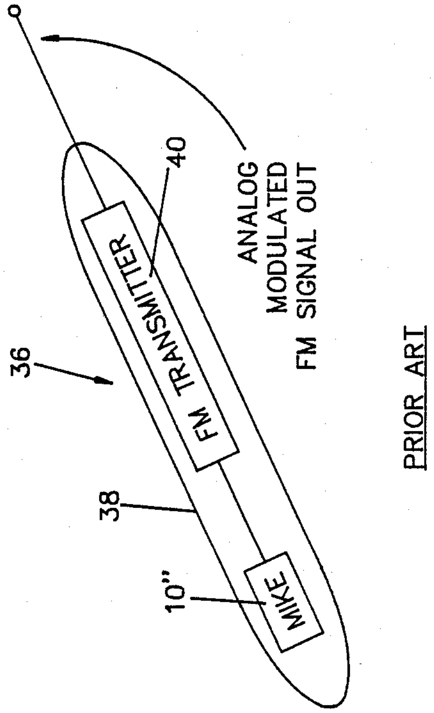
FIG. 3 is a simplified drawing of a prior art wireless microphone.
Figure 4:
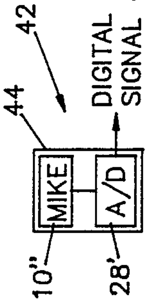
FIG. 4 is a simplified block diagram of a basic microphone according to the present invention.

In its simplest embodiment as depicted in FIG. 4, the digital microphone 42 of the present invention comprises an A/D converter chip 28' located adjacent a small microphone 10" within a single housing 44. It is contemplated by the inventor herein that the microphone 10" and the A/D converter chip 28' may be contained on a common support substrate (not shown) as a substitute for or located within the housing 44. Thus, with the microphone 42 of the present invention, the audio in is immediately converted to a digital signal for further processing.

The basic microphone 42 can be incorporated to advantage into a number of microphonic systems as will now be described. It should first be noted, however, that while the majority of the description that follows hereinafter (and the drawing figures which accompany it) is directed to a microphone system, as alluded to earlier herein, pickups for musical instruments, and the like, intended to develop an electrical signal corresponding to a sound input, can be made according to the teachings of the present invention to achieve common benefits thereby. Accordingly, it is the intent that this description and the claims appended hereto be accorded a breadth in accordance with the scope and spirit of the invention disclosed herein without regard to any apparent limitation to microphones.

Figure 5:
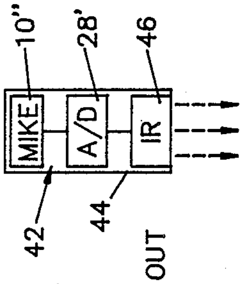
FIG. 5 is a simplified block diagram of a microphone according to the present invention adapted for direct infrared signal transmission.

As shown in FIG. 5, an infrared (IR) transmitter 46 can be located within the common housing 44 (or on the common substrate) with the microphone 42, so as to be driven by the output from the A/D converter chip 28'. This embodiment would be suitable for use with a stand-mounted microphone or hanging microphone which could transmit its IR signal to be received by an IR receiver located in the band pit, off stage, or some other close by location for connection to a mixer channel 22, or the like. A modified version of this embodiment is shown in FIG. 6 wherein the mixer channel 22 is provided with an IR interface 48 and the IR transmitter 46 is connected to the IR interface 48 by means of an optic fiber cable 50.

Figure 6:
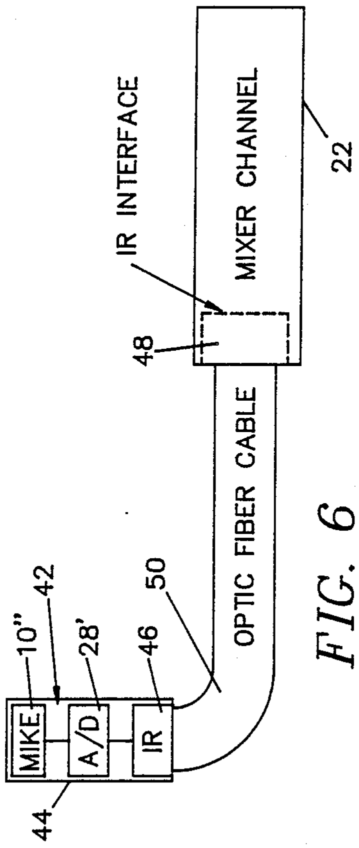
FIG. 6. is a simplified block diagram of a microphone according to the present invention adapted for direct infrared signal transmission to a mixer channel by use of a fiber optic cable.
Figure 7:
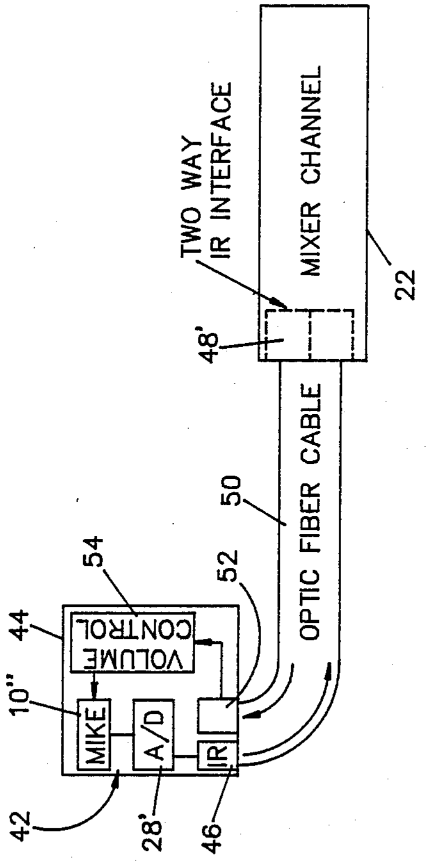
FIG. 7 is a simplified block diagram of a microphone according to the present invention adapted for infrared signal transmission to a mixer channel by use of a fiber optic cable with volume control being accomplished at the microphone by means of a volume control signal back over the fiber optic cable from the mixer channel.

A preferred modification for the embodiment of FIG. 6 is shown in FIG. 7 where the mixer channel 22 contains a two-way IR interface 48' for sending a volume setting signal back along the optic fiber cable 50 in response to an input to the mixer channel 22 by a sound engineer. The mike 10''' employed in this embodiment is a volume-adjustable microphone according to the present invention as will be described shortly. There is an IR detector 52 for detecting the volume control signal from the cable 50. The detector 52 is connected to a volume control circuit 54 which, in turn, is connected to control the volume of the mike 10'''. In this way, the problem-causing analog volume control potentiometer of the prior art mixer channels is eliminated along with the line losses and bad connections of the prior art electrical cables 16 employed to connect the signal thereto.

Figure 8:
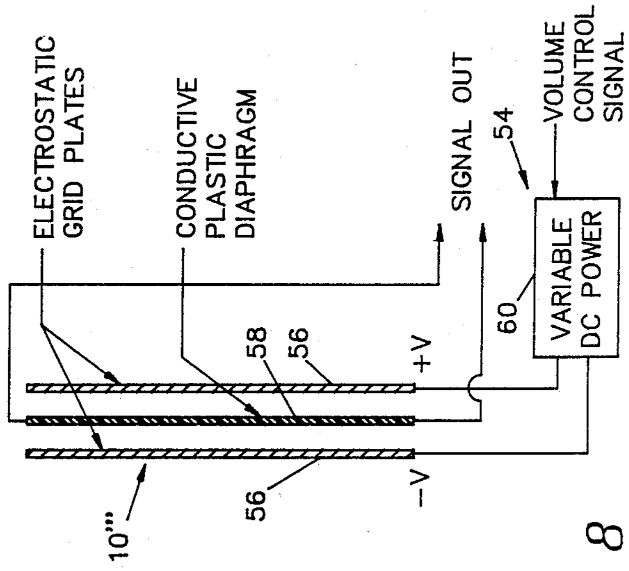
FIG. 8 is a simplified drawing of the preferred construction for an electrostatic microphone according to the present invention having volume control accomplished at the microphone by means of a volume control signal input thereto.

The preferred construction for an electrostatic microphone according to the present invention, generally indicated as 10''', which can have the volume thereof adjusted in response to a control signal in, is shown in FIG. 8. The microphone 10''' comprises a pair of spaced, parallel, electrostatic grid plates 56 having a conductive plastic diaphragm 58 disposed in parallel therebetween. The grid plates 56 are connected to respective ones of the + and − outputs from a variable DC power source 60 which is adjustable as to its voltage output level as a result of a volume control signal into it. In the preferred embodiment, the control signal is a binary number indicating the volume level and the DC power source includes a battery and a variable voltage divider circuit operated by digital logic as a function of the binary number.

Figure 9:
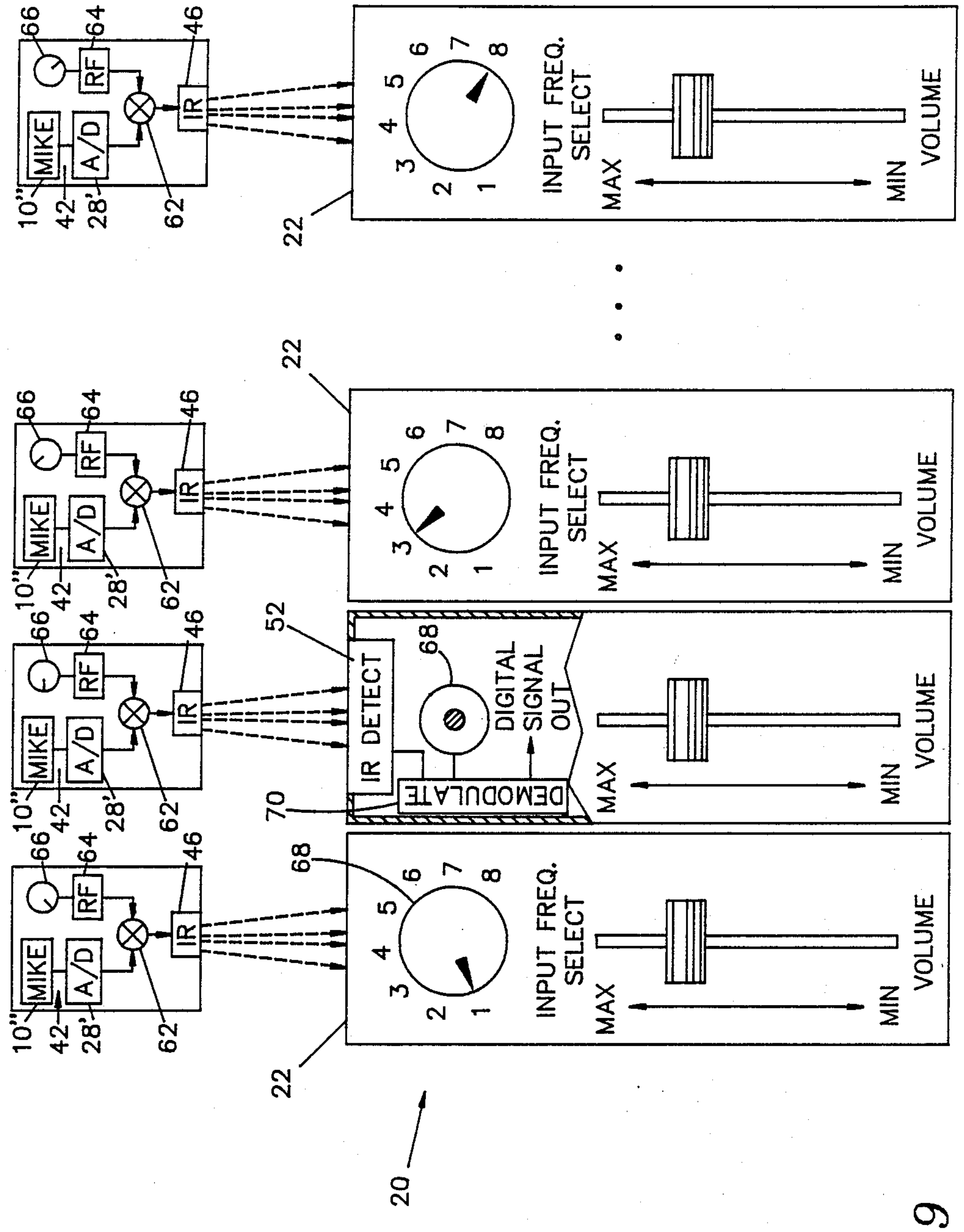
FIG. 9 is a detailed drawing of a sound system according to the present invention in one embodiment thereof wherein the microphones transmit a digital audio signal by direct infrared signal to corresponding ones of a plurality of mixer channels adapted to receive the signals from selectable ones of the microphones.

A typical system installation employing components according to the present invention in one embodiment is shown in FIG. 9. This embodiment would be limited to installations where the microphones (or pickups) were to be in fixed locations and there was virtually no chance that there would be light blocking interference between the digital microphones 42 and the mixer channels 22. In this embodiment, the output of each digital microphone 42 is mixed at 62 with the output of an adjustable (selectable) radio frequency (RF) source 64. Each RF source 64 is set for a different frequency by means of its associated selector means 66. The digital audio modulated RF signal is then used to drive the IR transmitter 46. Each mixer channel 22 is provided with a selector switch 68 by means of which the microphone it will control can be selected. The output of the IR detector 52 is connected to a demodulator 70. The selector switch 68 sets the frequency that the demodulator 70 responds to. As a result, the output of the demodulator 70 (employed by the balance of the mixer channel 22) is the binary audio signal corresponding to the digital microphone 42 operating at the same RF frequency.

Figure 10:
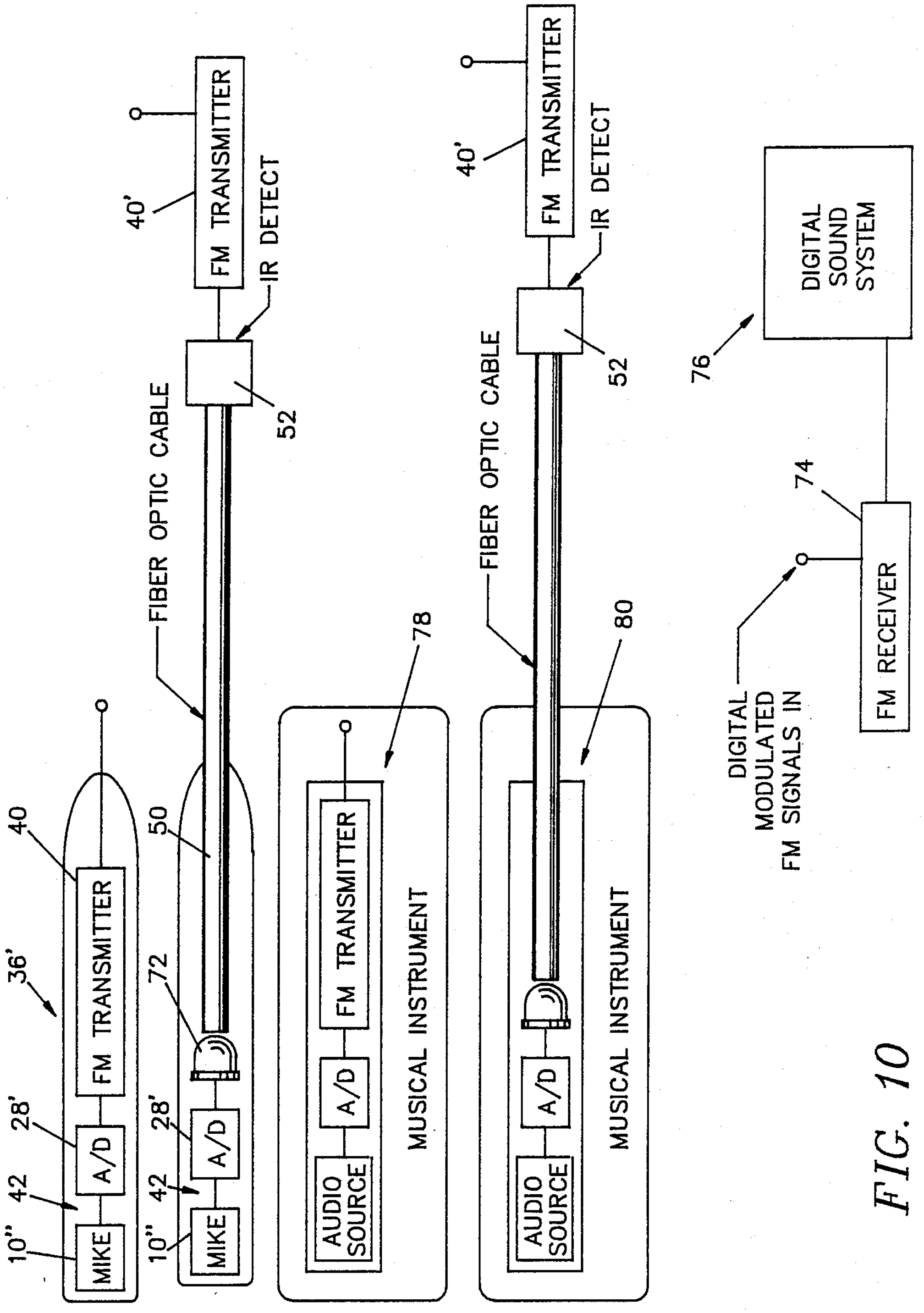
FIG. 10 is a detailed drawing of a sound system according to the present invention in another embodiment thereof wherein the microphones and pickups transmit a digital audio signal from an RF transmitter located adjacent the stage to a remote RF receiver for connection to the balance of the sound system.

Further microphone and system embodiments are shown in FIG. 10. The arrangement as depicted in FIG. 10 is intended for a more active environment where the limitations of low power IR transmission are inappropriate. The system includes a hand-held, wireless transmitting microphone 36' wherein the microphone 10'' is connected to the A/D chip 28' which, in turn, is connected to drive an RF, preferably FM, transmitter 40. As a result, the output from the microphone 36, is a digital modulated FM signal. The other digital microphone 42 employs an IR diode 72 as the IR transmitter. The microphone 42 has a fiber optic cable 50 connected thereto with the diode 72 inputting its signal into the cable 50. The other end of the cable 50 is connected to an IR detector 52 connected to the input of an FM transmitter 40' located close adjacent the microphone (e.g. within 10–30 feet). Thus, like the FM transmitter 40 located within the wireless microphone 36', the FM transmitter 40' outputs a digital modulated FM signal. The FM signals are picked up by an FM receiver 74 connected to the balance of the digital sound system, generally indicated as 76. While the terms "transmitter" and "receiver" are employed in the singular, those skilled in the art will appreciate that multiple units and/or multiple frequencies can be employed to provide multiple audio signals corresponding to their individual sources for use within the sound system 76. As indicated in the figure, a wireless musical instrument pickup 78 and an optically cabled, musical instrument pickup 80 with wireless FM transmission to the sound system 76 substantially similar to the microphones described above can also be provided to the overall system of this embodiment.

Figure 11:
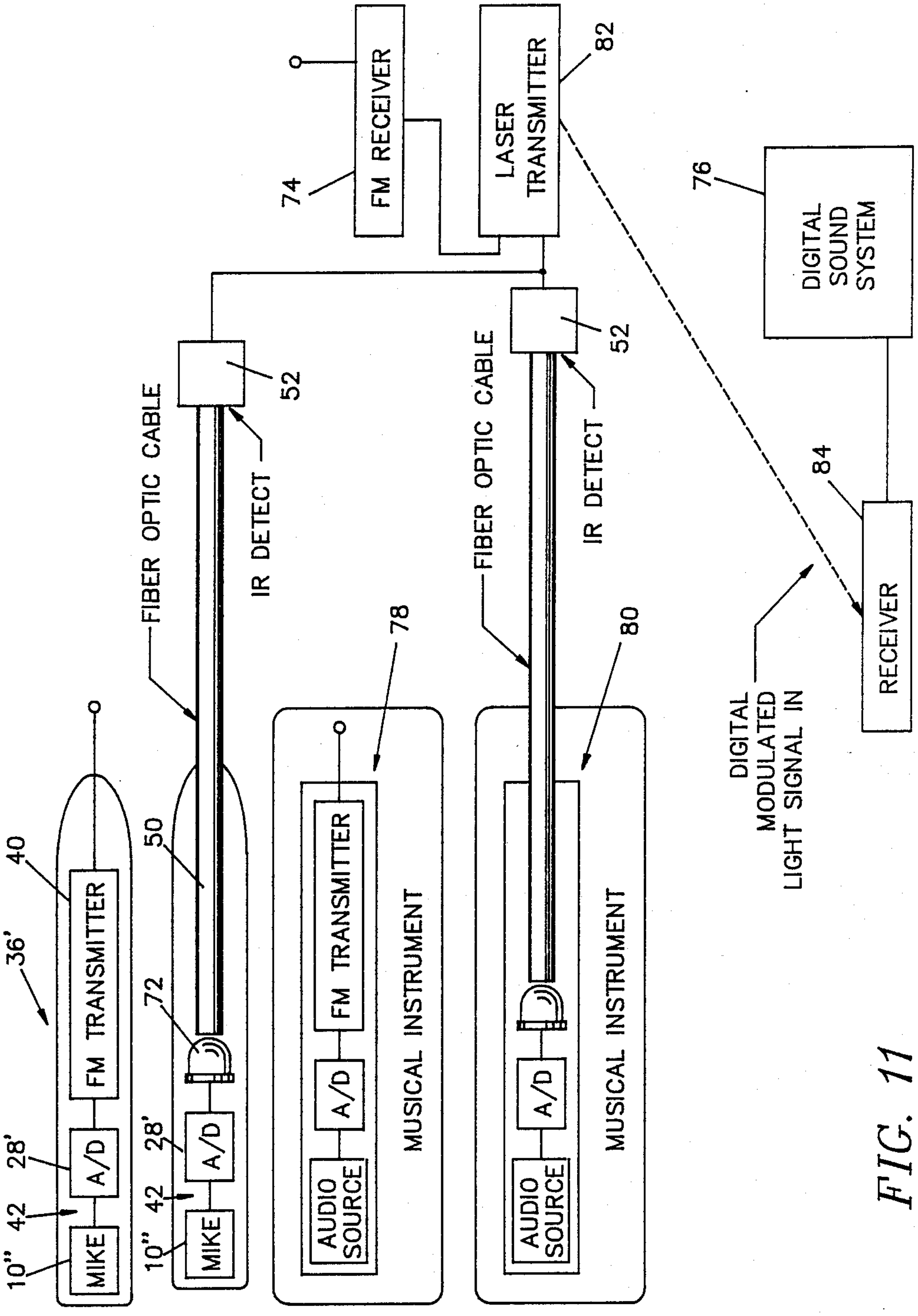
FIG. 11 is a detailed drawing of a sound system according to the present invention in yet another embodiment thereof wherein the microphones and pickups transmit a digital audio signal from a laser infrared transmitter located adjacent the stage to a remote infrared receiver for connection to the balance of the sound system.

Variations of the microphone and system embodiments of FIG. 10 are shown in FIG. 11. The system includes a hand-held, wireless transmitting microphone 36' as described above wherein the microphone 10'' is connected to the A/D chip 28' which, in turn, is connected to drive an FM transmitter 40. In the other digital microphone 42 which employs an IR diode 72 as the IR transmitter, the other end of the cable 50 is connected to an IR detector 52 connected to the input of a laser IR transmitter 82 located in a location where it can transmit to an IR receiver 84 which is then connected as the input to the balance of the system 76. The FM signals are picked up by a locally located FM receiver 74 which is also connected as an input to the laser IR transmitter 82. As indicated in the figure, a wireless musical instrument pickup 78 and an optically cabled, musical instrument pickup 80 substantially similar to the microphones described above can again be provided in the overall system of this embodiment.

It should also be noted that while the use of IR light is preferred throughout the system as described, visible light could also be employed within the scope and spirit of the present invention—both for wireless transmission and transmission through optic fiber cable. In many instances, visible light for wireless transmission may, if fact, be preferred as it allows the data transmitting light beams to be aimed visually at the receivers and, at the same time, provides an additional visible optical effect to attendees at concerts, and the like, where light beams are a part of the overall aesthetic effect and ambience.

Wherefore, having thus described the present invention, what is claimed is:

1. A microphone/pickup device providing a digital output therefrom comprising:

(a) microphone element means for sensing sound vibrations and for producing an analog electrical signal reflecting said sound vibrations at an output thereof;

(b) analog to digital converter means having an input connected to receive said analog electrical signal directly from said microphone element for producing a digital signal reflecting said sound vibrations at an output thereof, said output of said analog to digital converter means being the output of the microphone/pickup device;

(c) mixer means disposed in combination with said analog to digital converter means for producing an output therefrom comprising the combination of signals input to a pair of inputs thereof, said output of said analog to digital converter means being connected to one of said pair of inputs of said mixer means;

(d) radio frequency generator means having an output disposed in combination with said analog to digital converter means for generating an RF signal at said output thereof, said output of said radio frequency generator means being connected to the other of said pair of inputs of said mixer means;

(e) light emitting diode means disposed in combination with said analog to digital converter means and operably connected to be activated by said output of said mixer means whereby said light emitting diode means emits a beam of light modulated with said digital signal and an RF carrier; and, (f) means disposed in combination with said analog to digital converter means connected for selectably adjusting the frequency of said output of said radio frequency generator means.

2. A microphone/pickup device providing a digital output therefrom comprising:

(a) microphone element means for sensing sound vibrations and for producing an analog electrical signal reflecting said sound vibrations at an output thereof, said microphone element including volume control means for changing the amplitude of said analog electrical signal whereby the volume of the output from the microphone/pickup device is controllable; and additionally comprising, (b) analog to digital converter means having an input connected to receive said analog electrical signal directly from said microphone element for producing a digital signal reflecting said sound vibrations at an output thereof, said output of said analog to digital converter means being the output of the microphone/pickup device; and, (c) light detector means disposed in combination with said analog to digital converter means and operably connected to said volume control means for detecting a volume control light signal from a user input thereto and for transmitting said volume control light signal to said volume control means to cause said volume control means to change the amplitude of said analog electrical signal as dictated by said volume control light signal.

3. The digital microphone/pickup device of claim 2 wherein said microphone element is an electrostatic element comprising a movable conductive diaphragm disposed between a pair of electrostatic grid plates and said volume control means comprises:

(a) a variable DC power source connected to said electrostatic grid plates for applying a DC voltage potential thereacross; and, (b) means responsive to said volume control light signal for setting the DC voltage potential output by said variable DC power source to said electrostatic grid plates to a level indicated by said volume control light signal.

4. A microphone/pickup system employing a digital signal throughout comprising:

(a) a digital microphone/pickup device comprising, (a1) microphone/pickup element means for sensing sound vibrations and for producing an analog electrical signal reflecting said sound vibrations at an output thereof; and, (a2) analog to digital converter means directly connected to receive said analog electrical signal at an input thereof and for producing a digital signal reflecting said sound vibrations at an output thereof, said output of said analog to digital converter means being the output of said microphone/pickup device;-and, (b) a user device disposed at a removed location from said analog to digital converter means and operatively connected to receive and use said digital signal;

(c) mixer means disposed in combination with said analog to digital converter means for producing an output therefrom comprising the combination of signals input to a pair of inputs thereof, said output of said analog to digital converter means being connected to one of said pair of inputs of said mixer means;

(d) radio frequency generator means having an output and disposed in combination with said analog to digital converter means for generating an RF signal at said output thereof, said output of said radio frequency generator means being connected to the other of said pair of inputs of said mixer means;

(e) light emitting diode means disposed in combination with said analog to digital converter means and operably connected to be activated by said output of said mixer means whereby said light emitting diode means emits a beam of light modulated with said digital signal and an RF carrier;

(f) light receiver means for receiving said beam of light, for demodulating said digital signal therefrom and for connecting said demodulated digital signal to said user device;

(g) means disposed in combination with said analog to digital converter means connected for selectably adjusting the frequency of said output of said radio frequency generator means; and, (h) means included in said light receiver means for selecting the RF frequency to be removed to produce said digital signal.

5. A microphone/pickup system employing a digital signal throughout comprising:

(a) a digital microphone/pickup device comprising, (a1) microphone/pickup element means for sensing sound vibrations and for producing an analog electrical signal reflecting said sound vibrations at an output thereof, said microphone/pickup element means including volume control means for changing the amplitude of said analog electrical signal whereby the volume of the output from the microphone/pickup device is controllable; and, (a2) analog to digital converter means directly connected to receive said analog electrical signal at an input thereof and for producing a digital signal reflecting said sound vibrations at an output thereof, said output of said analog to digital converter means being the output of said microphone/pickup device;

(b) a user device disposed at a removed location from said analog to digital converter means and operatively connected to receive and use said digital signal; and, (c) light detector means disposed in combination with said analog to digital converter means and operably connected to said volume control means for detecting a volume control light signal from a user input thereto and for transmitting said volume control light signal to said volume control means to cause said volume control means to change the amplitude of said analog electrical signal as dictated by said volume control light signal; and, (d) means associated with said user device for outputting a said volume control light signal to set the volume of said microphone/pickup device.

6. The digital microphone/pickup system of claim 5 wherein said microphone/pickup element is an electrostatic element comprising a movable conductive diaphragm disposed between a pair of electrostatic grid plates and said volume control means comprises:

(a) a variable DC power source connected to said electrostatic grid plates for applying a DC voltage potential thereacross; and, (b) means responsive to said volume control light signal for setting the DC voltage potential output by said variable DC power source to said electrostatic grid plates to a level indicated by said volume control light signal.

7. A microphone/pickup system employing a digital signal throughout comprising:

(a) a plurality of digital microphone/pickup devices each comprising, (a1) microphone/pickup element means for sensing sound vibrations and for producing an analog electrical signal reflecting said sound vibrations at an output thereof; and, (a2) analog to digital converter means having an input connected to receive said analog electrical signal for producing a digital signal reflecting said sound vibrations at an output thereof, said output of said analog to digital converter means being the output of said microphone/pickup device; and, (b) a plurality of user devices disposed at a location removed from said analog to digital converter means and operatively connected to receive and use said digital signal from respective ones of said digital microphone/pickup devices;

(c) mixer means disposed by at least one said support structure means for producing an output therefrom comprising the combination of signals input to a pair of inputs thereof, said output of said analog to digital converter means thereof being connected to one of said pair of inputs of said mixer means;

(d) radio frequency generator means having an output and disposed by said at least one said support structure means for generating an RF signal at said output thereof, said output of said radio frequency generator means being connected to the other of said pair of inputs of said mixer means;

(e) light emitting diode means disposed by said at least one said support structure means and operably connected to be activated by said output of said mixer means whereby said light emitting diode means emits a beam of light modulated with said digital signal and an RF carrier;

(f) light receiver means for receiving said beam of light, for demodulating said digital signal therefrom and for connecting said demodulated digital signal to a said user device;

(g) means disposed by said at least one said support structure means connected for selectably adjusting the frequency of said output of said radio frequency generator means; and, (h) means included in said light receiver means for selecting the RF frequency to be removed to produce said digital signal.

8. A microphone/pickup system employing a digital signal throughout comprising:

(a) a plurality of digital microphone/pickup devices each comprising, (a1) microphone/pickup element means for sensing sound vibrations and for producing an analog electrical signal reflecting said sound vibrations at an output thereof, at least one said microphone/pickup element means including volume control means for changing the amplitude of said analog electrical signal whereby the volume of the output from the microphone/pickup device is controllable; and, (a2) analog to digital converter means having an input connected to receive said analog electrical signal for producing a digital signal reflecting said sound vibrations at an output thereof, said output of said analog to digital converter means being the output of said microphone/pickup device; and, (b) a plurality of user devices disposed at a location removed from said analog to digital converter means and operatively connected to receive and use said digital signal from respective ones of said digital microphone/pickup devices;

(c) light detector means disposed in combination with said analog to digital converter means thereof and operably connected to said volume control means for detecting a volume control light signal from a user input thereto and for transmitting said volume control light signal to said volume control means to cause said volume control means to change the amplitude of said analog electrical signal as dictated by said volume control light signal; and, (d) means associated with at least one said user device for outputting a said volume control light signal to set the volume of said microphone/pickup device.

9. The digital microphone/pickup system of claim 8 wherein said microphone/pickup element is an electrostatic element comprising a movable conductive diaphragm disposed between a pair of electrostatic grid plates and said volume control means comprises:

(a) a variable DC power source connected to said electrostatic grid plates for applying a DC voltage potential thereacross; and, (b) means responsive to said volume control light signal for setting the DC voltage potential output by said variable DC power source to said electrostatic grid plates to a level indicated by said volume control light signal.

* * * * *